United States Patent
Fang (10) Patent No.: US 11,753,107 B2
(45) Date of Patent: Sep. 12, 2023

(54) CONTROL INTEGRATED STRUCTURE OF ELECTRICALLY ASSISTED BICYCLE AND CONTROLLING METHOD THEREOF

(71) Applicant: Hyena Inc., Taichung (TW)

(72) Inventor: Hsin-Yi Fang, Taichung (TW)

(73) Assignee: Hyena Inc., Taichung (TW)

( * ) Notice: Subject to any disclaimer, the term of this patent is extended or adjusted under 35 U.S.C. 154(b) by 48 days.

(21) Appl. No.: 17/450,168

(22) Filed: Oct. 7, 2021

(65) Prior Publication Data

US 2023/0049940 A1    Feb. 16, 2023

(30) Foreign Application Priority Data

Aug. 10, 2021   (TW) ................................ 110129506

(51) Int. Cl.
| | |
|---|---|
| *B62M 6/45* | (2010.01) |
| *H02J 7/00* | (2006.01) |
| *B62J 45/20* | (2020.01) |
| *B62J 43/13* | (2020.01) |
| *B62M 6/90* | (2010.01) |
| *H02P 27/06* | (2006.01) |

(52) U.S. Cl.
CPC ................ *B62M 6/45* (2013.01); *B62J 43/13* (2020.02); *B62J 45/20* (2020.02); *B62M 6/90* (2013.01); *H02J 7/0048* (2020.01); *H02J 7/0063* (2013.01); *H02J 7/0068* (2013.01); *H02J 7/00712* (2020.01); *H02P 27/06* (2013.01)

(58) Field of Classification Search
CPC .......... B62M 6/45; B62M 6/90; H02J 7/0048; H02J 7/00712; H02J 7/0063; H02J 7/0068; B62J 45/20; B62J 43/13; H02P 27/06
See application file for complete search history.

(56) References Cited

U.S. PATENT DOCUMENTS

| | | | |
|---|---|---|---|
| 2011/0095623 A1 | 4/2011 | Doh et al. | |
| 2016/0332532 A1 | 11/2016 | Ro | |
| 2019/0006980 A1* | 1/2019 | Sheeks | ...................... H02P 6/26 |
| 2020/0086745 A1* | 3/2020 | Kim | ...................... B60L 3/0046 |

FOREIGN PATENT DOCUMENTS

| | | |
|---|---|---|
| CN | 102114788 A | 7/2011 |
| CN | 102570568 A | 7/2012 |
| CN | 102548787 B | 1/2015 |

(Continued)

*Primary Examiner* — Jared Fureman
*Assistant Examiner* — Duc M Pham
(74) *Attorney, Agent, or Firm* — CKC & Partners Co., LLC (57) ABSTRACT

A control integrated structure of an electrically assisted bicycle includes a battery management system, a controller and a motor. The battery management system includes a battery assembly and an analog front end. The analog front end is electrically connected to the battery assembly. The controller includes a micro controller unit and a driver. The micro controller unit is electrically connected to the analog front end. The driver is electrically connected to the micro controller unit. The motor is electrically connected to the driver and controlled by the driver. The micro controller unit of the controller is directly electrically connected between the analog front end of the battery management system and the driver, thereby enabling the micro controller unit to control the motor via the driver.

13 Claims, 6 Drawing Sheets

(56) References Cited

FOREIGN PATENT DOCUMENTS

| | | | |
|---|---|---|---|
| CN | 104145400 | B | 2/2017 |
| CN | 108819752 | A | 11/2018 |
| CN | 209994126 | U | 1/2020 |
| CN | 106956602 | B | 7/2021 |
| JP | H08244671 | A | 9/1996 |
| TW | 710197 | B | 11/2020 |

* cited by examiner

CONTROL INTEGRATED STRUCTURE OF ELECTRICALLY ASSISTED BICYCLE AND CONTROLLING METHOD THEREOF

RELATED APPLICATIONS

This application claims priority to Taiwan Application Serial Number 110129506 filed on Aug. 10, 2021, which is herein incorporated by reference.

BACKGROUND

Technical Field

The present disclosure relates to a control structure of an electrically assisted bicycle and a controlling method thereof. More particularly, the present disclosure relates to a control integrated structure of an electrically assisted bicycle and a controlling method thereof.

Description of Related Art

Nowadays, electrical components are widely used in an application of an electrically assisted bicycle, such as a battery management system, a controller and a motor. In the conventional structure, the battery management system is connected to the controller for communicating and transmitting signals, thus controlling the motor. Because circuit complexity of the conventional structure is high, the conventional structure requires a certain cost in manufacturing. Moreover, when the battery management system and the controller communicate and transmit signals, a problem of compatibility usually exists, so that the battery management system and the controller require compatibility matching before communicating and transmitting. Therefore, a control integrated structure of an electrically assisted bicycle and a controlling method thereof having the features of low circuit complexity, without compatibility matching and low cost are commercially desirable.

SUMMARY

According to one aspect of the present disclosure, a control integrated structure of an electrically assisted bicycle includes a battery management system, a controller and a motor. The battery management system includes a battery assembly and an analog front end. The analog front end is electrically connected to the battery assembly. The controller includes a micro controller unit and a driver. The micro controller unit is electrically connected to the analog front end. The driver is electrically connected to the micro controller unit. The motor is electrically connected to the driver and controlled by the driver. The micro controller unit of the controller is directly electrically connected between the analog front end of the battery management system and the driver, thereby enabling the micro controller unit to control the motor via the driver.

According to another aspect of the present disclosure, a controlling method of a control integrated structure of an electrically assisted bicycle includes performing a first controlling step and a second controlling step. The first controlling step is performed to drive an analog front end of a battery management system to generate a charge enable signal, thereby enabling a battery assembly of the battery management system to be controlled by the charge enable signal. The second controlling step is performed to drive a micro controller unit of a controller to control a motor via a driver of the controller. The analog front end of the battery management system is electrically connected to the battery assembly. The motor is electrically connected to the driver and controlled by the driver, and the micro controller unit of the controller is directly electrically connected between the analog front end of the battery management system and the driver.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
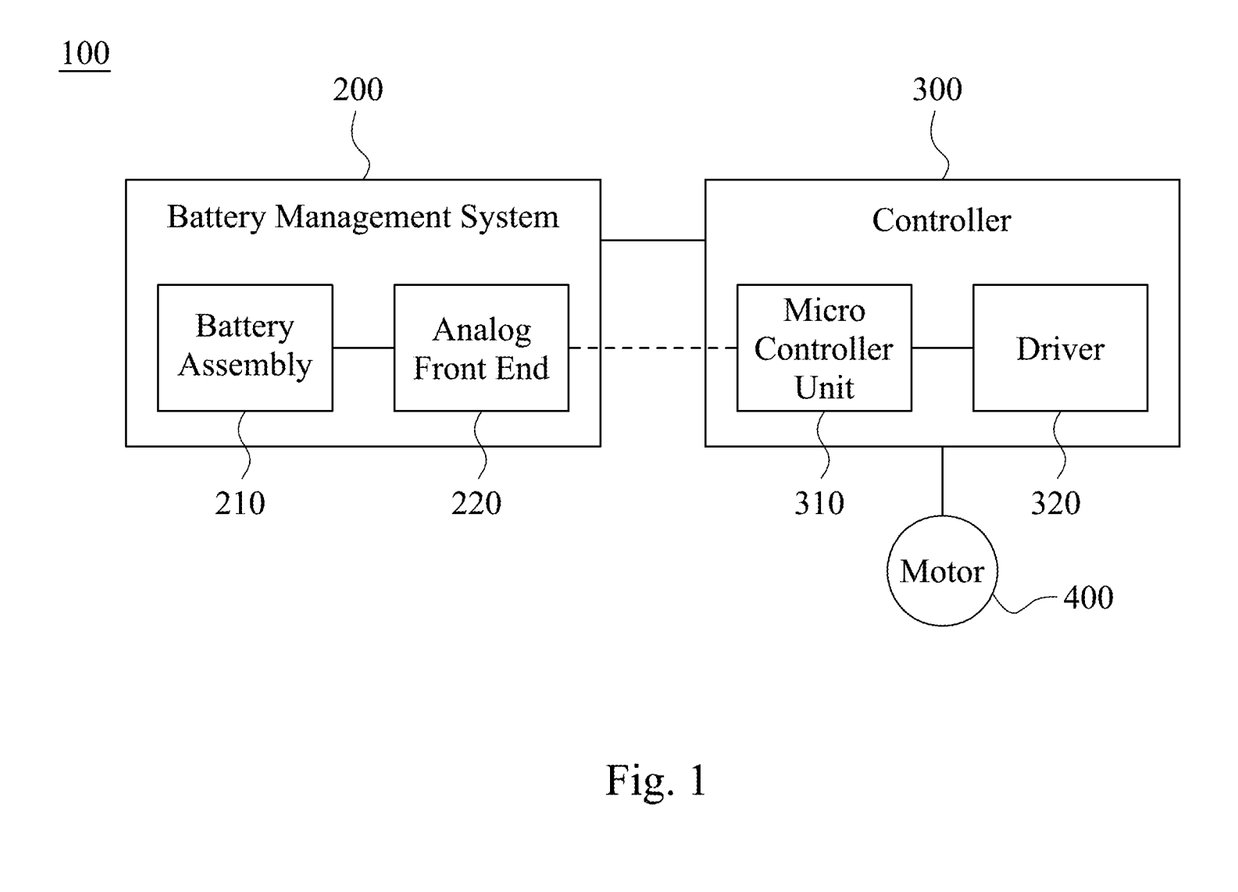
FIG. 1 shows a schematic view of a control integrated structure of an electrically assisted bicycle according to a first embodiment of the present disclosure.

FIG. 1 shows a schematic view of a control integrated structure 100 of an electrically assisted bicycle according to a first embodiment of the present disclosure. The control integrated structure 100 of the electrically assisted bicycle includes a battery management system 200, a controller 300 and a motor 400. The battery management system 200 includes a battery assembly 210 and an analog front end 220 (AFE). The analog front end 220 is electrically connected to the battery assembly 210. The controller 300 includes a micro controller unit 310 (MCU) and a driver 320. The micro controller unit 310 is electrically connected to the analog front end 220. The driver 320 is electrically connected to the micro controller unit 310. The motor 400 is electrically connected to the driver 320 and controlled by the driver 320. The micro controller unit 310 of the controller 300 is directly electrically connected between the analog front end 220 of the battery management system 200 and the driver 320, thereby enabling the micro controller unit 310 to control the motor 400 via the driver 320. Therefore, the control integrated structure 100 of the electrically assisted bicycle of the present disclosure only needs one integrated MCU (i.e., the micro controller unit 310) to control the battery management system 200 and other components of the controller 300, thereby not only reducing circuit complexity of two micro controller units in the conventional technique (e.g., one of the two micro controller units is disposed in a conventional battery management system, and the other of the two micro controller units is disposed in a conventional controller), but also solving the problem of the conventional technique that the use of the two micro controller units requires compatibility matching and greatly reducing the manufacturing cost at the same time.

Figure 2:
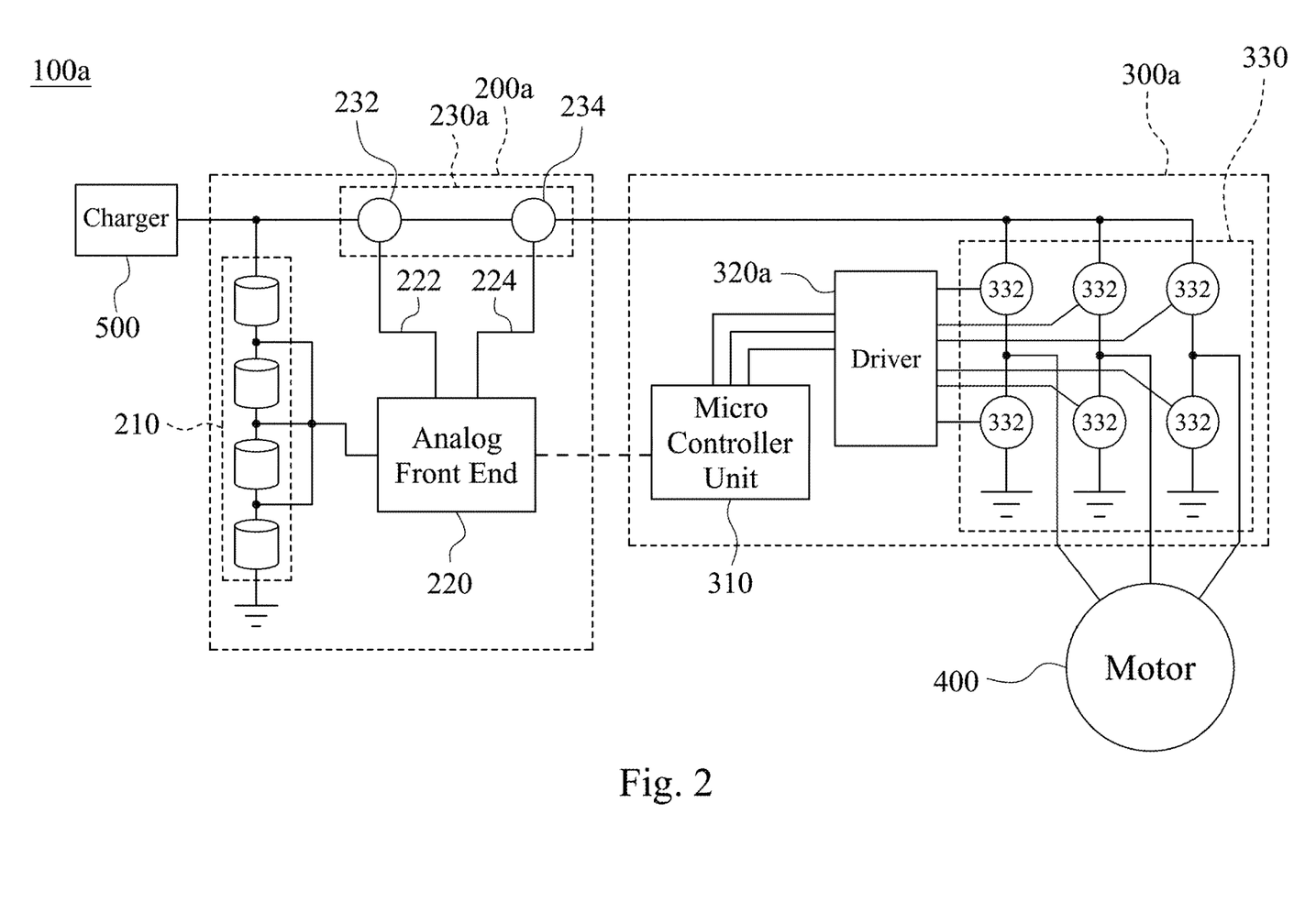
FIG. 2 shows a schematic view of a control integrated structure of an electrically assisted bicycle according to a second embodiment of the present disclosure.

FIG. 2 shows a schematic view of a control integrated structure 100a of an electrically assisted bicycle according to a second embodiment of the present disclosure. The control integrated structure 100a of the electrically assisted bicycle includes a battery management system 200a, a controller 300a, a motor 400 and a charger 500.

The battery management system 200a is connected between the controller 300a and the charger 500. The battery management system 200a includes a battery assembly 210, an analog front end 220 and a charge/discharge switching module 230a. The battery assembly 210 is electrically connected to the analog front end 220. The charge/discharge switching module 230a is electrically connected to the battery assembly 210 and the analog front end 220. In detail, the battery assembly 210 includes a plurality of battery cells, and the battery cells are connected in series with each other. The analog front end 220 detects the battery assembly 210 to obtain a battery power level and transmits the battery power level to a micro controller unit 310 of the controller 300a. The micro controller unit 310 generates a charge/discharge signal according to the battery power level and transmits the charge/discharge signal to the analog front end 220. The analog front end 220 provides one of a charge enable signal 222 and a discharge enable signal 224 to the charge/discharge switching module 230a according to the charge/discharge signal, thereby enabling the micro controller unit 310 to control the battery assembly 210 via the analog front end 220. In addition, the charge/discharge switching module 230a includes a charge switching element 232 and a discharge switching element 234. The charge switching element 232 is electrically connected to the battery assembly 210, the analog front end 220 and the charger 500. The charge switching element 232 is controlled by the charge enable signal 222. The discharge switching element 234 is electrically connected to the charge switching element 232, the analog front end 220 and the controller 300a. The discharge switching element 234 is controlled by the discharge enable signal 224. When the charge/discharge switching module 230a receives the charge enable signal 222 of the analog front end 220, the charge switching element 232 is turned on to charge the battery assembly 210. On the contrary, when the charge/discharge switching module 230a receives the discharge enable signal 224 of the analog front end 220, the discharge switching element 234 is turned on to discharge from the battery assembly 210 to the controller 300a. In one embodiment, the charge switching element 232 and the discharge switching element 234 can be implemented by a Metal Oxide Semiconductor Field Effect Transistor (MOSFET), but the present disclosure is not limited thereto.

The controller 300a includes the micro controller unit 310, a driver 320a and a driving switching module 330. The micro controller unit 310 is electrically connected to the analog front end 220. The driver 320a is electrically connected to the micro controller unit 310. The driving switching module 330 is electrically connected to the driver 320a, the motor 400 and the charge/discharge switching module 230a. The micro controller unit 310 controls the motor 400 via the driver 320a and the driving switching module 330. The driving switching module 330 includes a plurality of driving switching elements 332. The driving switching elements 332 are electrically connected between the driver 320a and the motor 400. When the charge/discharge switching module 230a receives the discharge enable signal 224, the driver 320a is controlled by the micro controller unit 310 to generate a plurality of switching signals, and each of the driving switching elements 332 is turned on or off according to each of the switching signals. In one embodiment, the number of the driving switching elements 332 can be six and may be implemented by the MOSFET. Signals can be transmitted between the micro controller unit 310 and the analog front end 220 via a communication interface. The communication interface can be a Controller Area Network Bus (CAN Bus), a Universal Asynchronous Receiver/Transmitter (UART), a Serial Peripheral Interface (SPI) or an Inter-Integrated Circuit (I2C), but the present disclosure is not limited thereto.

The motor 400 is electrically connected to the driver 320a and controlled by the driver 320a. The motor 400 is electrically connected to the driving switching elements 332 of the driving switching module 330, so that the micro controller unit 310 can control the motor 400 via the driver 320a and the driving switching module 330.

The charger 500 is electrically connected to the battery assembly 210 and the charge switching element 232 of the charge/discharge switching module 230a. When the charge/discharge switching module 230a receives the charge enable signal 222 of the analog front end 220, the charge switching element 232 is turned on to allow the charger 500 to charge the battery assembly 210.

Therefore, the control integrated structure 100a of the electrically assisted bicycle of the present disclosure only needs one integrated MCU (i.e., the micro controller unit 310) to control the battery management system 200a and other components of the controller 300a, thereby not only reducing circuit complexity of two micro controller units in the conventional technique, but also solving the problem of the conventional technique that the use of the two micro controller units requires compatibility matching. In addition, the use of the one integrated MCU (i.e., the micro controller unit 310) can greatly reduce the manufacturing cost.

In another example of the embodiment of FIG. 2, the micro controller unit 310 may not be used for charging/discharging, and the analog front end 220 itself can generate the charge enable signal 222 or the discharge enable signal 224 according to the battery power level. In detail, the analog front end 220 detects the battery assembly 210 to obtain the battery power level and provides one of the charge enable signal 222 and the discharge enable signal 224 to the charge/discharge switching module 230a according to the battery power level, thereby enabling the analog front end 220 to control charging and discharging of the battery assembly 210. Therefore, the present disclosure can greatly increase the control efficiency via the analog front end 220 having control capability.

Figure 3:
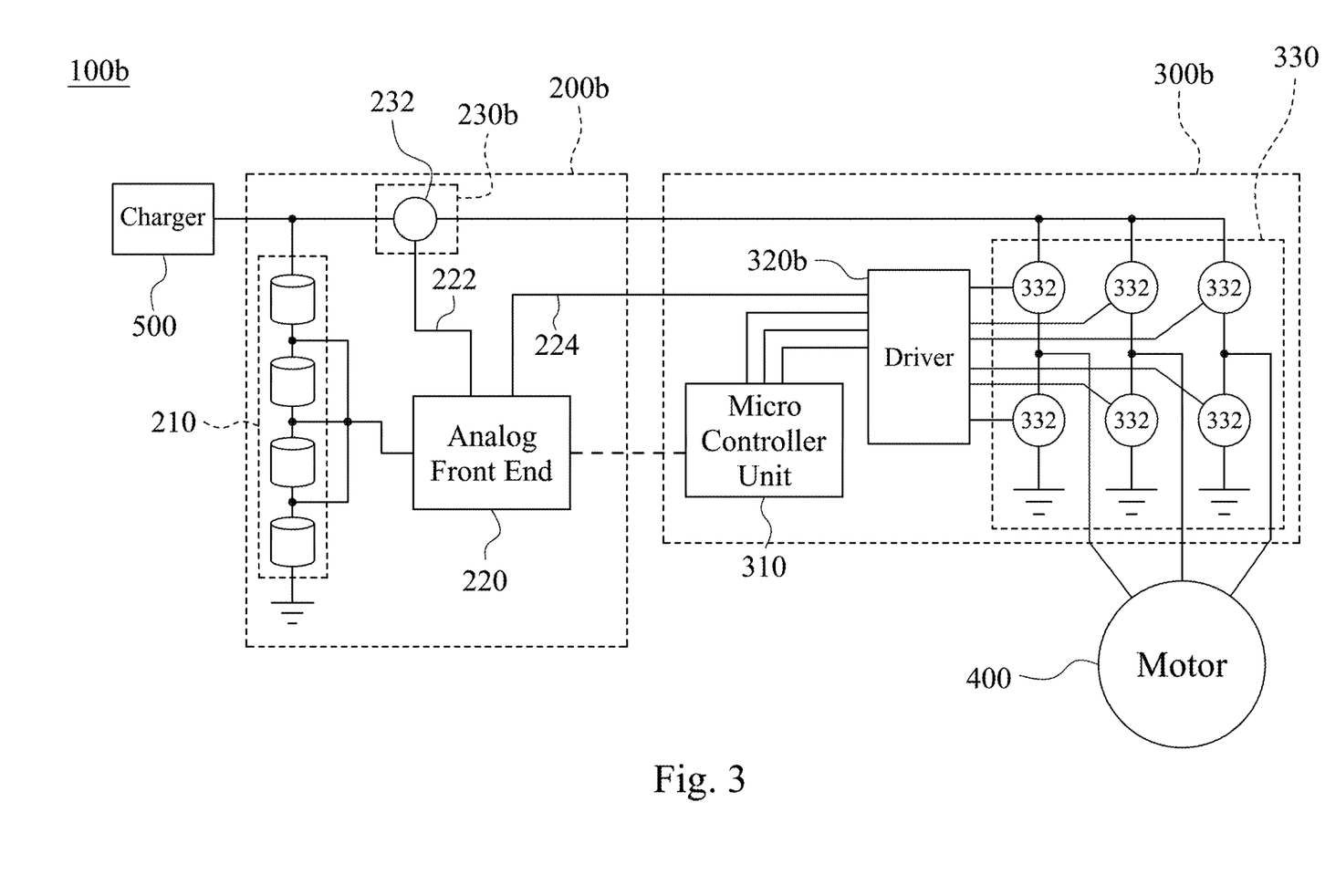
FIG. 3 shows a schematic view of a control integrated structure of an electrically assisted bicycle according to a third embodiment of the present disclosure.

Please refer to FIGS. 2 and 3. FIG. 3 shows a schematic view of a control integrated structure 100b of an electrically assisted bicycle according to a third embodiment of the present disclosure. The control integrated structure 100b of the electrically assisted bicycle includes a battery management system 200b, a controller 300b, a motor 400 and a charger 500.

The battery management system 200b includes a battery assembly 210, an analog front end 220 and a charge/discharge switching module 230b. In FIG. 3, the battery assembly 210 and the analog front end 220 are the same as the battery assembly 210 and the analog front end 220 of FIG. 2, respectively, and will not be described again herein. The charge/discharge switching module 230b only includes a charge switching element 232. The charge switching element 232 is electrically connected to the battery assembly 210, the analog front end 220, the controller 300b and the charger 500. The charge switching element 232 is controlled by a charge enable signal 222. When the charge switching element 232 of the charge/discharge switching module 230b receives the charge enable signal 222 of the analog front end 220, the charge switching element 232 is turned on to charge the battery assembly 210.

The controller 300b includes a micro controller unit 310, a driver 320b and a driving switching module 330. In FIG. 3, the micro controller unit 310 and the driving switching module 330 are the same as the micro controller unit 310 and the driving switching module 330 of FIG. 2, respectively, and will not be described again herein. The driver 320b is electrically connected to the analog front end 220, the micro controller unit 310 and the driving switching module 330. The analog front end 220 detects the battery assembly 210 to obtain a battery power level and transmits the battery power level to the micro controller unit 310. The micro controller unit 310 generates a charge/discharge signal according to the battery power level and transmits the charge/discharge signal to the analog front end 220. The analog front end 220 generates one of the charge enable signal 222 and a discharge enable signal 224 according to the charge/discharge signal. When the analog front end 220 generates the charge enable signal 222, the analog front end 220 transmits the charge enable signal 222 to the charge switching element 232, and the charge switching element 232 is turned on to charge the battery assembly 210. On the contrary, when the analog front end 220 generates the discharge enable signal 224, the analog front end 220 transmits the discharge enable signal 224 to the driver 320b, and the driver 320b controls the driving switching module 330 to discharge from the battery assembly 210 to the controller 300b.

The motor 400 and the charger 500 are the same as the motor 400 and the charger 500 of FIG. 2, respectively, and will not be described again herein. Therefore, the control integrated structure 100b of the electrically assisted bicycle of the present disclosure only needs one integrated MCU (i.e., the micro controller unit 310) to control the battery management system 200b and other components of the controller 300b, thereby not only reducing circuit complexity of two micro controller units in the conventional technique, but also solving the problem of the conventional technique that the use of the two micro controller units requires compatibility matching. In addition, the use of the one integrated MCU (i.e., the micro controller unit 310) can greatly reduce the manufacturing cost.

In another example of the embodiment of FIG. 3, the micro controller unit 310 may not be used for charging/discharging, and the analog front end 220 itself can generate the charge enable signal 222 or the discharge enable signal 224 according to the battery power level. In detail, the analog front end 220 detects the battery assembly 210 to obtain the battery power level and generates one of the charge enable signal 222 and the discharge enable signal 224 according to the battery power level. When the analog front end 220 generates the charge enable signal 222, the analog front end 220 transmits the charge enable signal 222 to the charge switching element 232, and the charge switching element 232 is turned on to charge the battery assembly 210. On the contrary, when the analog front end 220 generates the discharge enable signal 224, the analog front end 220 transmits the discharge enable signal 224 to the driver 320b, and the driver 320b controls the driving switching module 330 to discharge from the battery assembly 210 to the controller 300b. Therefore, the present disclosure can greatly increase the control efficiency via the analog front end 220 having control capability.

Figure 4:
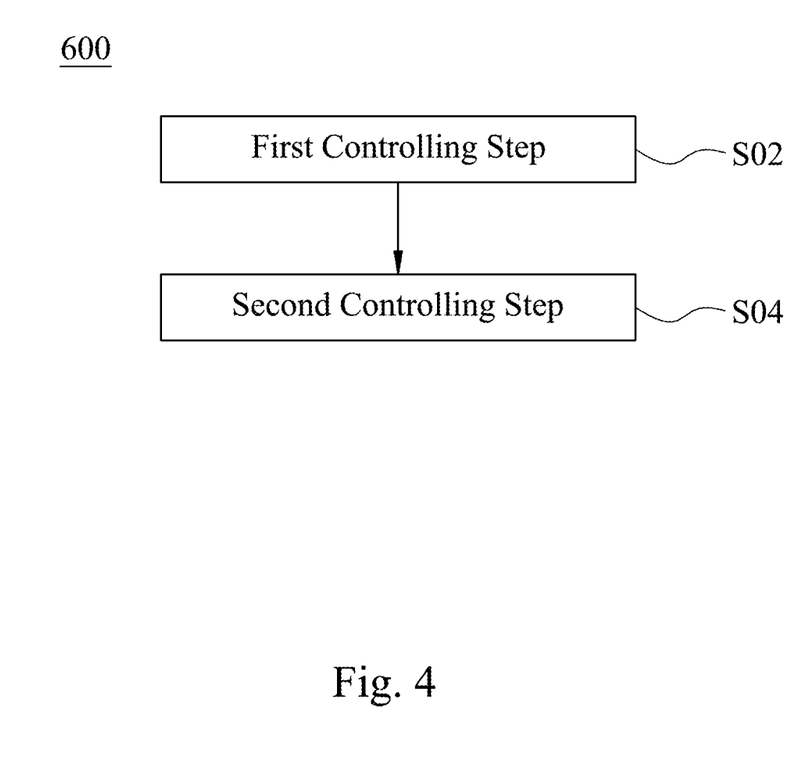
FIG. 4 shows a flow chart of a controlling method of a control integrated structure of an electrically assisted bicycle according to a fourth embodiment of the present disclosure.

Please refer to FIGS. 1 and 4. FIG. 4 shows a flow chart of a controlling method 600 of a control integrated structure 100 of an electrically assisted bicycle according to a fourth embodiment of the present disclosure. The controlling method 600 is used to control the control integrated structure 100 of the electrically assisted bicycle of FIG. 1 and includes performing a first controlling step S02 and a second controlling step S04. The first controlling step S02 is performed to drive an analog front end 220 of a battery management system 200 to generate a charge enable signal, thereby enabling a battery assembly 210 of the battery management system 200 to be controlled by the charge enable signal. The second controlling step S04 is performed to drive a micro controller unit 310 of a controller 300 to control a motor 400 via a driver 320 of the controller 300. Therefore, the controlling method 600 of the control integrated structure 100 of the electrically assisted bicycle only needs one integrated MCU (i.e., the micro controller unit 310) to control the battery management system 200 and other components of the controller 300, thereby not only reducing circuit complexity of two micro controller units in the conventional technique, but also solving the problem of the conventional technique that the use of the two micro controller units requires compatibility matching and greatly reducing the manufacturing cost at the same time.

Figure 5:
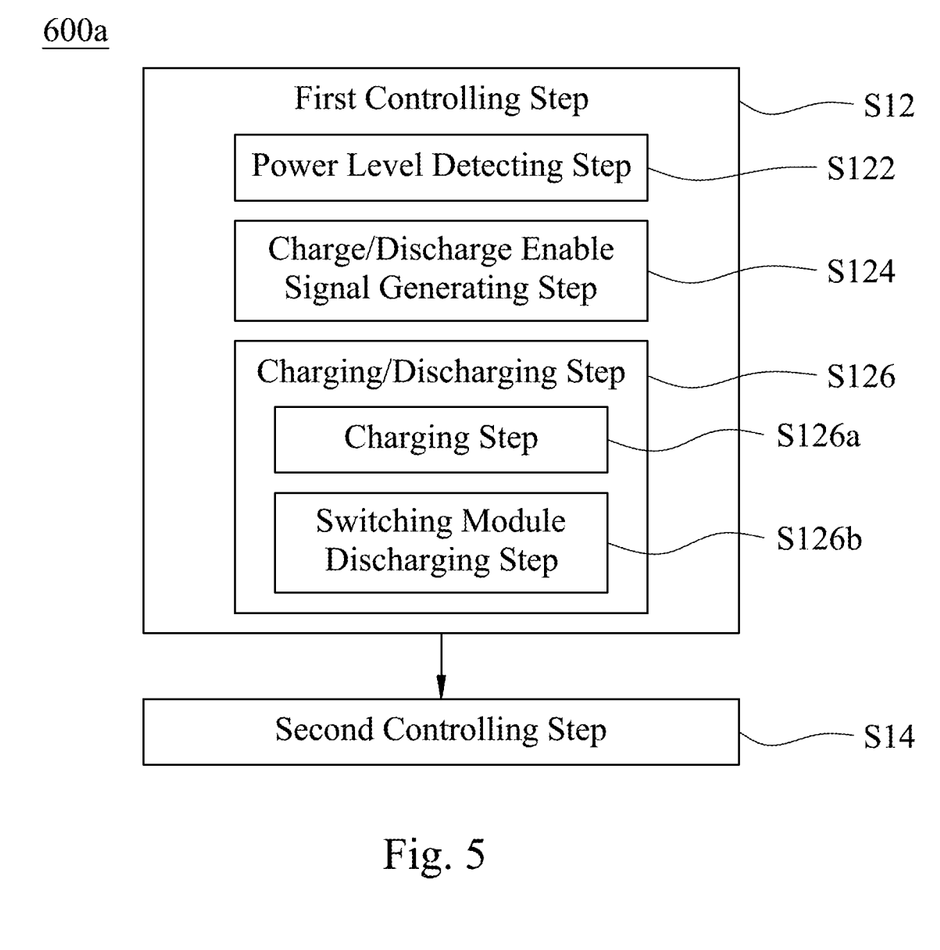
FIG. 5 shows a flow chart of a controlling method of a control integrated structure of an electrically assisted bicycle according to a fifth embodiment of the present disclosure.

Please refer to FIGS. 2 and 5. FIG. 5 shows a flow chart of a controlling method 600a of a control integrated structure 100a of an electrically assisted bicycle according to a fifth embodiment of the present disclosure. The controlling method 600a is used to control the control integrated structure 100a of the electrically assisted bicycle of FIG. 2 and includes performing a first controlling step S12 and a second controlling step S14.

The first controlling step S12 is performed to drive an analog front end 220 of a battery management system 200a to generate a charge enable signal 222, thereby enabling a battery assembly 210 of the battery management system 200a to be controlled by the charge enable signal 222. In detail, the first controlling step S12 includes performing a power level detecting step S122, a charge/discharge enable signal generating step S124 and a charging/discharging step S126. The power level detecting step S122 is performed to drive the analog front end 220 to detect the battery assembly 210 to obtain a battery power level and transmit the battery power level to the micro controller unit 310 of the controller 300a. The charge/discharge enable signal generating step S124 is performed to drive the micro controller unit 310 to generate a charge/discharge signal according to the battery power level and transmit the charge/discharge signal to the analog front end 220, and then drive the analog front end 220 to provide one of the charge enable signal 222 and the discharge enable signal 224 to the charge/discharge switching module 230a according to the charge/discharge signal. The charging/discharging step S126 is performed to drive one of the charge switching element 232 and the discharge switching element 234 of the charge/discharge switching module 230a according to the one of the charge enable signal 222 and the discharge enable signal 224 so as to perform one of a charging step S126a and a switching module discharging step S126b. The charging step S126a includes driving the charge/discharge switching module 230a to turn on the charge switching element 232 according to the charge enable signal 222 to charge the battery assembly 210. The switching module discharging step S126b includes driving the charge/discharge switching module 230a to turn on the discharge switching element 234 according to the discharge enable signal 224 to discharge from the battery assembly 210 to the controller 300a. Hence, the first controlling step S02 can utilize the micro controller unit 310 of the controller 300a to control charging and discharging of the battery assembly 210 via the analog front end 220, thereby enabling the micro controller unit 310 to control the power distribution.

The second controlling step S14 is performed to drive the micro controller unit 310 of the controller 300a to control the motor 400 via the driver 320a of the controller 300a. In detail, when the charge/discharge switching module 230a receives the discharge enable signal 224, the driver 320a is controlled by the micro controller unit 310 to generate a plurality of switching signals, and each of the six driving switching elements 332 is turned on or off according to each of the switching signals to control the operation of the motor 400. Therefore, the controlling method 600a of the control integrated structure 100a of the electrically assisted bicycle of the present disclosure only needs one integrated MCU (i.e., the micro controller unit 310) to control the battery management system 200a and other components of the controller 300a, thereby not only reducing circuit complexity of two micro controller units in the conventional technique, but also solving the problem of the conventional technique that the use of the two micro controller units requires compatibility matching. In addition, the use of the one integrated MCU (i.e., the micro controller unit 310) can greatly reduce the manufacturing cost.

In another example of the embodiment of FIG. 5, the micro controller unit 310 may not be used for charging/discharging, and the analog front end 220 itself can generate the charge enable signal 222 or the discharge enable signal 224 according to the battery power level. In detail, the power level detecting step S122 of the first controlling step S12 is performed to drive the analog front end 220 to detect the battery assembly 210 to obtain the battery power level. The charge/discharge enable signal generating step S124 is performed to drive the analog front end 220 to provide one of the charge enable signal 222 and the discharge enable signal 224 to the charge/discharge switching module 230a according to the battery power level. The charging/discharging step S126 is performed to drive one of the charge switching element 232 and the discharge switching element 234 of the charge/discharge switching module 230a according to the one of the charge enable signal 222 and the discharge enable signal 224 so as to perform one of the charging step S126a and the switching module discharging step S126b. Accordingly, the first controlling step S12 can utilize the analog front end 220 to control charging and discharging of the battery assembly 210 instead of the micro controller unit 310 of the controller 300a. The present disclosure can greatly increase the control efficiency via the analog front end 220 having control capability.

Figure 6:
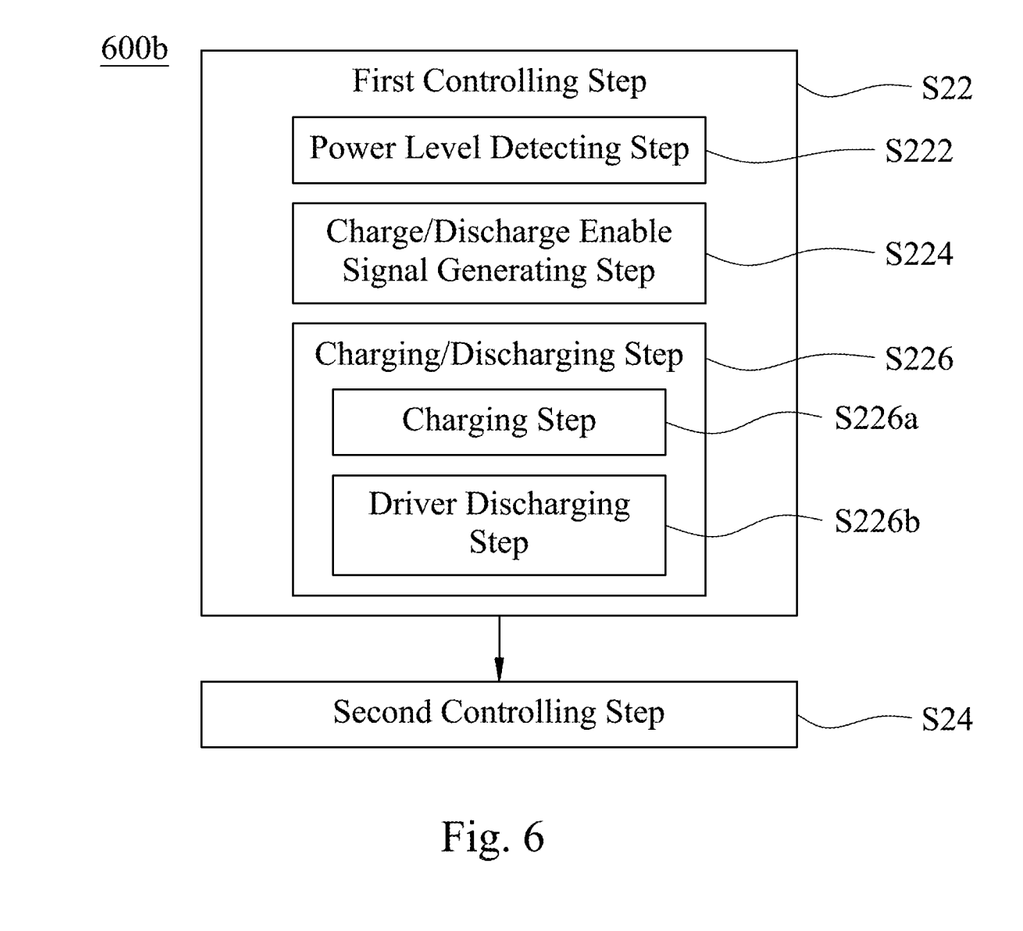
FIG. 6 shows a flow chart of a controlling method of a control integrated structure of an electrically assisted bicycle according to a sixth embodiment of the present disclosure.

Please refer to FIGS. 3 and 6. FIG. 6 shows a flow chart of a controlling method 600b of a control integrated structure 100b of an electrically assisted bicycle according to a sixth embodiment of the present disclosure. The controlling method 600b is used to control the control integrated structure 100b of the electrically assisted bicycle of FIG. 3 and includes performing a first controlling step S22 and a second controlling step S24.

The first controlling step S22 is performed to drive an analog front end 220 of a battery management system 200b to generate a charge enable signal 222, thereby enabling a battery assembly 210 of the battery management system 200b to be controlled by the charge enable signal 222. In detail, the first controlling step S22 includes performing a power level detecting step S222, a charge/discharge enable signal generating step S224 and a charging/discharging step S226. The power level detecting step S222 is performed to drive the analog front end 220 to detect the battery assembly 210 to obtain a battery power level and transmit the battery power level to the micro controller unit 310 of the controller 300b. The charge/discharge enable signal generating step S224 is performed to drive the micro controller unit 310 to generate a charge/discharge signal according to the battery power level and transmit the charge/discharge signal to the analog front end 220, and then drive the analog front end 220 to generate one of the charge enable signal 222 and a discharge enable signal 224 according to the charge/discharge signal. The charging/discharging step S226 is performed to drive one of a charge switching element 232 of a charge/discharge switching module 230b and the driver 320b according to the one of the charge enable signal 222 and the discharge enable signal 224 so as to perform one of a charging step S226a and a driver discharging step S226b. The charging step S226a includes driving the charge/discharge switching module 230b to turn on the charge switching element 232 according to the charge enable signal 222 to charge the battery assembly 210. The driver discharging step S226b includes driving the driver 320b to control a driving switching module 330 according to the discharge enable signal 224 to discharge from the battery assembly 210 to the controller 300b. Hence, the first controlling step S22 can utilize the micro controller unit 310 of the controller 300b to control charging and discharging of the battery assembly 210 via the analog front end 220, thereby enabling the micro controller unit 310 to control the power distribution.

The second controlling step S24 is performed to drive the micro controller unit 310 of the controller 300b to control the motor 400 via the driver 320b of the controller 300b. In detail, when the driver 320b receives the discharge enable signal 224, the driver 320b is controlled by the micro controller unit 310 to generate a plurality of switching signals, and each of the six driving switching elements 332 is turned on or off according to each of the switching signals to control the operation of the motor 400. Therefore, the controlling method 600b of the control integrated structure 100b of the electrically assisted bicycle of the present disclosure only needs one integrated MCU (i.e., the micro controller unit 310) to control the battery management system 200b and other components of the controller 300b, thereby not only reducing circuit complexity of two micro controller units in the conventional technique, but also solving the problem of the conventional technique that the use of the two micro controller units requires compatibility matching. In addition, the use of the one integrated MCU (i.e., the micro controller unit 310) can greatly reduce the manufacturing cost.

In another example of the embodiment of FIG. 6, the micro controller unit 310 may not be used for charging/discharging, and the analog front end 220 itself can generate the charge enable signal 222 or the discharge enable signal 224 according to the battery power level. In detail, the power level detecting step S222 of the first controlling step S22 is performed to drive the analog front end 220 to detect the battery assembly 210 to obtain the battery power level. The charge/discharge enable signal generating step S224 is performed to drive the analog front end 220 to generate one of the charge enable signal 222 and the discharge enable signal 224 according to the battery power level. The charging/discharging step S226 is performed to drive one of the charge switching element 232 of the charge/discharge switching module 230*b* and the driver 320*b* according to the one of the charge enable signal 222 and the discharge enable signal 224 so as to perform one of the charging step S226*a* and the driver discharging step S226*b*. Accordingly, the first controlling step S22 can utilize the analog front end 220 to control charging and discharging of the battery assembly 210 instead of the micro controller unit 310 of the controller 300*b*. The present disclosure can greatly increase the control efficiency via the analog front end 220 having control capability.

According to the aforementioned embodiments and examples, the advantages of the present disclosure are described as follows.

1. The control integrated structure of the electrically assisted bicycle and the controlling method thereof of the present disclosure only need one integrated MCU to control the battery management system and other components of the controller, thereby not only reducing circuit complexity of two micro controller units in the conventional technique, but also solving the problem of the conventional technique that the use of the two micro controller units requires compatibility matching.

2. The use of the one integrated MCU can greatly reduce the manufacturing cost.

3. The present disclosure can greatly increase the control efficiency via the analog front end having control capability because the analog front end is used to control charging and discharging of the battery assembly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A control integrated structure of an electrically assisted bicycle, comprising:
   a battery management system, comprising:
      a battery assembly; and
      an analog front end electrically connected to the battery assembly;
   a controller, comprising:
      a micro controller unit electrically connected to the analog front end; and
      a driver electrically connected to the micro controller unit; and
   a motor electrically connected to the driver and controlled by the driver;
   wherein the micro controller unit of the controller is directly electrically connected between the analog front end of the battery management system and the driver, thereby enabling the micro controller unit to control the motor via the driver;
   wherein the battery management system and the controller only comprise one integrated micro controller unit that is the micro controller unit.

2. The control integrated structure of the electrically assisted bicycle of claim 1, further comprising:
   a charge/discharge switching module electrically connected to the battery assembly and the analog front end, wherein the analog front end detects the battery assembly to obtain a battery power level and transmits the battery power level to the micro controller unit, the micro controller unit generates a charge/discharge signal according to the battery power level and transmits the charge/discharge signal to the analog front end, and the analog front end provides one of a charge enable signal and a discharge enable signal to the charge/discharge switching module according to the charge/discharge signal, thereby enabling the micro controller unit to control the battery assembly via the analog front end.

3. The control integrated structure of the electrically assisted bicycle of claim 2, wherein the charge/discharge switching module comprises:
   a charge switching element electrically connected to the battery assembly and the analog front end, wherein the charge switching element is controlled by the charge enable signal; and
   a discharge switching element electrically connected to the charge switching element, the analog front end and the controller, wherein the discharge switching element is controlled by the discharge enable signal;
   wherein when the charge/discharge switching module receives the charge enable signal of the analog front end, the charge switching element is turned on to charge the battery assembly;
   wherein when the charge/discharge switching module receives the discharge enable signal of the analog front end, the discharge switching element is turned on to discharge from the battery assembly to the controller.

4. The control integrated structure of the electrically assisted bicycle of claim 2, further comprising:
   a driving switching module electrically connected to the driver, the motor and the charge/discharge switching module, wherein the micro controller unit controls the motor via the driver and the driving switching module.

5. The control integrated structure of the electrically assisted bicycle of claim 4, wherein the driving switching module comprises:
   a plurality of driving switching elements electrically connected between the driver and the motor;
   wherein when the charge/discharge switching module receives the discharge enable signal, the driver is controlled by the micro controller unit to generate a plurality of switching signals, and each of the driving switching elements is turned on or off according to each of the switching signals.

6. The control integrated structure of the electrically assisted bicycle of claim 1, further comprising:
- a charge/discharge switching module electrically connected to the battery assembly and the analog front end, wherein the analog front end detects the battery assembly to obtain a battery power level and provides one of a charge enable signal and a discharge enable signal to the charge/discharge switching module according to the battery power level, thereby enabling the analog front end to control charging and discharging of the battery assembly.

7. The control integrated structure of the electrically assisted bicycle of claim 1, further comprising:
- a charge switching element electrically connected to the battery assembly, the analog front end and the controller; and
- a driving switching module electrically connected to the driver, the motor and the charge switching element;
- wherein the analog front end is electrically connected to the driver, the analog front end detects the battery assembly to obtain a battery power level and transmits the battery power level to the micro controller unit, the micro controller unit generates a charge/discharge signal according to the battery power level and transmits the charge/discharge signal to the analog front end, and the analog front end generates one of a charge enable signal and a discharge enable signal according to the charge/discharge signal;
- wherein when the analog front end generates the charge enable signal, the analog front end transmits the charge enable signal to the charge switching element, and the charge switching element is turned on to charge the battery assembly;
- wherein when the analog front end generates the discharge enable signal, the analog front end transmits the discharge enable signal to the driver, and the driver controls the driving switching module to discharge from the battery assembly to the controller.

8. The control integrated structure of the electrically assisted bicycle of claim 1, further comprising:
- a charge switching element electrically connected to the battery assembly, the analog front end and the controller; and
- a driving switching module electrically connected to the driver, the motor and the charge switching element;
- wherein the analog front end is electrically connected to the driver, and the analog front end detects the battery assembly to obtain a battery power level and generates one of a charge enable signal and a discharge enable signal according to the battery power level;
- wherein when the analog front end generates the charge enable signal, the analog front end transmits the charge enable signal to the charge switching element, and the charge switching element is turned on to charge the battery assembly;
- wherein when the analog front end generates the discharge enable signal, the analog front end transmits the discharge enable signal to the driver, and the driver controls the driving switching module to discharge from the battery assembly to the controller.

9. A controlling method of a control integrated structure of an electrically assisted bicycle, comprising:
- performing a first controlling step to drive an analog front end of a battery management system to generate a charge enable signal, thereby enabling a battery assembly of the battery management system to be controlled by the charge enable signal; and
- performing a second controlling step to drive a micro controller unit of a controller to control a motor via a driver of the controller;
- wherein the analog front end of the battery management system is electrically connected to the battery assembly, the motor is electrically connected to the driver and controlled by the driver, and the micro controller unit of the controller is directly electrically connected between the analog front end of the battery management system and the driver;
- wherein the battery management system and the controller only comprise one integrated micro controller unit that is the micro controller unit.

10. The controlling method of the control integrated structure of the electrically assisted bicycle of claim 9, wherein the first controlling step comprises:
- performing a power level detecting step to drive the analog front end to detect the battery assembly to obtain a battery power level and transmit the battery power level to the micro controller unit;
- performing a charge/discharge enable signal generating step to drive the micro controller unit to generate a charge/discharge signal according to the battery power level and transmit the charge/discharge signal to the analog front end, and then drive the analog front end to provide one of the charge enable signal and a discharge enable signal to a charge/discharge switching module according to the charge/discharge signal; and
- performing a charging/discharging step to drive one of a charge switching element and a discharge switching element of the charge/discharge switching module according to the one of the charge enable signal and the discharge enable signal so as to perform one of a charging step and a switching module discharging step;
- wherein the charging step comprises driving the charge/discharge switching module to turn on the charge switching element according to the charge enable signal to charge the battery assembly;
- wherein the switching module discharging step comprises driving the charge/discharge switching module to turn on the discharge switching element according to the discharge enable signal to discharge from the battery assembly to the controller.

11. The controlling method of the control integrated structure of the electrically assisted bicycle of claim 9, wherein the first controlling step comprises:
- performing a power level detecting step to drive the analog front end to detect the battery assembly to obtain a battery power level;
- performing a charge/discharge enable signal generating step to drive the analog front end to provide one of the charge enable signal and a discharge enable signal to a charge/discharge switching module according to the battery power level; and
- performing a charging/discharging step to drive one of a charge switching element and a discharge switching element of the charge/discharge switching module according to the one of the charge enable signal and the discharge enable signal so as to perform one of a charging step and a switching module discharging step;
- wherein the charging step comprises driving the charge/discharge switching module to turn on the charge switching element according to the charge enable signal to charge the battery assembly;
- wherein the switching module discharging step comprises driving the charge/discharge switching module to turn on the discharge switching element according to the discharge enable signal to discharge from the battery assembly to the controller.

12. The controlling method of the control integrated structure of the electrically assisted bicycle of claim 9, wherein the first controlling step comprises:

performing a power level detecting step to drive the analog front end to detect the battery assembly to obtain a battery power level and transmit the battery power level to the micro controller unit;

performing a charge/discharge enable signal generating step to drive the micro controller unit to generate a charge/discharge signal according to the battery power level and transmit the charge/discharge signal to the analog front end, and then drive the analog front end to generate one of the charge enable signal and a discharge enable signal according to the charge/discharge signal; and performing a charging/discharging step to drive one of a charge switching element of a charge/discharge switching module and the driver according to the one of the charge enable signal and the discharge enable signal so as to perform one of a charging step and a driver discharging step;

wherein the charging step comprises driving the charge/discharge switching module to turn on the charge switching element according to the charge enable signal to charge the battery assembly;

wherein the driver discharging step comprises driving the driver to control a driving switching module according to the discharge enable signal to discharge from the battery assembly to the controller.

13. The controlling method of the control integrated structure of the electrically assisted bicycle of claim 9, wherein the first controlling step comprises:

performing a power level detecting step to drive the analog front end to detect the battery assembly to obtain a battery power level;

performing a charge/discharge enable signal generating step to drive the analog front end to generate one of the charge enable signal and a discharge enable signal according to the battery power level; and performing a charging/discharging step to drive one of a charge switching element of a charge/discharge switching module and the driver according to the one of the charge enable signal and the discharge enable signal so as to perform one of a charging step and a driver discharging step;

wherein the charging step comprises driving the charge/discharge switching module to turn on the charge switching element according to the charge enable signal to charge the battery assembly;

wherein the driver discharging step comprises driving the driver to control a driving switching module according to the discharge enable signal to discharge from the battery assembly to the controller.

* * * * *